United States Patent
Inoue et al.

(10) Patent No.: US 12,204,302 B2
(45) Date of Patent: Jan. 21, 2025

(54) CONTROL APPARATUS, CONTROL METHOD AND PROGRAM

(71) Applicant: Nippon Telegraph and Telephone Corporation, Tokyo (JP)

(72) Inventors: Hiroshi Inoue, Musashino (JP); Hidetoshi Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 379 days.

(21) Appl. No.: 17/641,693

(22) PCT Filed: Sep. 18, 2019

(86) PCT No.: PCT/JP2019/036634
§ 371 (c)(1),
(2) Date: Mar. 9, 2022

(87) PCT Pub. No.: WO2021/053770
PCT Pub. Date: Mar. 25, 2021

(65) Prior Publication Data
US 2022/0299960 A1  Sep. 22, 2022

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; G06Q 50/06
See application file for complete search history.

(56) References Cited

U.S. PATENT DOCUMENTS

2012/0030494 A1* 2/2012 Yu .......... H03K 17/693 713/340
2013/0110970 A1* 5/2013 Meyerhofer ....... G06Q 10/0631 709/217

(Continued)

FOREIGN PATENT DOCUMENTS

JP  2013176284      9/2013
JP  2015-12753 A  * 1/2015

(Continued)

OTHER PUBLICATIONS

[No Author Listed] [online], "Demand response," NGK Insulators, Ltd., Product Information, retrieved on Sep. 1, 2019, retrieved from URL <https://www.ngk.co.jp/product/nas/application/feature06/>, 9 pages (with English Translation).

*Primary Examiner* — Kidest Bahta
(74) *Attorney, Agent, or Firm* — Fish & Richardson P.C.

(57) ABSTRACT

A selection unit configured to select, when receiving a first request in which a first power amount requested to be supplied and a timing when the first power amount is needed are specified, a group with a supply characteristic that enables power supply at the timing, among a plurality of groups into which a plurality of power supply sources are classified in accordance with power supply characteristics, and a request unit configured to transmit, to each of one or more of the power supply sources classified into the group selected by the selection unit or a device that controls power supply of the power supply source, a second request in which a second power amount to be supplied by the power supply source and the timing are specified.

14 Claims, 4 Drawing Sheets

(56) References Cited

U.S. PATENT DOCUMENTS

2014/0025213 A1* 1/2014 Otsuki .................... H02J 3/008
                                                                    700/291
2015/0002100 A1   1/2015 Kudo et al.

FOREIGN PATENT DOCUMENTS

| JP | 2016116283 | 6/2016 |
| JP | 2016171620 | 9/2016 |

* cited by examiner

| GROUP ID | RESPONSE TIME CLASSIFICATION | STORAGE BATTERY ID | STORAGE AMOUNT |
|---|---|---|---|
| GROUP 1 | HIGH | ... | ... |
| GROUP 2 | INTERMEDIATE | ... | ... |
| GROUP 3 | LOW | ... | ... |
| ... | ... | ... | ... |

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2019/036634, having an International Filing Date of Sep. 18, 2019. The disclosure of the prior application is considered part of the disclosure of this application, and is incorporated in its entirety into this application.

TECHNICAL FIELD

The present invention relates to a control apparatus, a control method, and a program.

BACKGROUND ART

In recent years, as solar cells and the like have become widespread, consumers (e.g., factories, general households, and the like) have generated electric power to utilize the electric power. These consumers are also called prosumers because they not only consume but also generate electric power.

Here, a mechanism called a virtual power plant (VPP) is known, which integrates and controls electric power owned by prosumers and the like as if it functioned as one power plant. In addition, a mechanism called a demand response (DR) to control a demand for electric power of a consumer side is known (e.g., see NPL 1).

CITATION LIST

Non Patent Literature

NPL 1: "Demand Response", [online], Internet <URL: https://www.ngk.co.jp/product/nas/application/feature06/>

SUMMARY OF THE INVENTION

Technical Problem

However, electric power has been sold and purchased in electricity markets in recent years, and for example, it is assumed that a power company or the like specifies a timing when electric power is needed and an amount of the electric power and purchases needed electric power from a virtual power plant. In such a case, for example, an aggregator that integrates and controls electric power owned by each prosumer needs to determine to which prosumer a request to supply electric power is made to achieve supply of the specified amount of electric power at the specified timing. However, power supply characteristics (e.g., a response time of a storage battery, etc.) of each prosumer may be different, and thus the above determination is considered to be difficult.

An embodiment of the present invention has been made in view of the above-described points, and an objective of the invention is to select a supply source with supply characteristics that can meet a request for power supply.

Means for Solving the Problem

To achieve the above objective, a control apparatus according to the present embodiment includes a selection unit configured to select, when receiving a first request in which a first power amount requested to be supplied and a timing when the first power amount is needed are specified, a group with a supply characteristic that enables power supply at the timing, among a plurality of groups into which a plurality of power supply sources are classified in accordance with power supply characteristics, and a request unit configured to transmit, to each of one or more of the power supply sources classified into the group selected by the selection unit or a device that controls power supply of the power supply source, a second request in which a second power amount to be supplied by the power supply source and the timing are specified.

Effects of the Invention

A supply source having supply characteristics that meet a request for power supply can be selected.

DESCRIPTION OF EMBODIMENTS

Hereinafter, an embodiment according to the present invention will be described. In the present embodiment, a power supply system 1 will be described, which is capable of selecting a supply source (e.g., a storage battery owned by a prosumer) having supply characteristics that meet a request for power supply when a virtual power plant receives the request for power supply.

Here, in the present embodiment, it is assumed that the supply source of electric power that can be supplied by a virtual power plant (hereinafter abbreviated as a "VPP") is a storage battery owned by a prosumer (e.g., a general household, a factory, or the like). However, this is an example, and examples of the supply source of electric power supplied by the VPP may include a fuel cell owned by a prosumer (e.g., a fuel cell mounted in an automobile, etc.) and various power generation and power storage facilities, such as small-sized power generation facilities owned by municipalities, business organizations, and the like, in addition to the storage battery owned by the prosumer.

Overall Configuration of Power Supply System 1

Figure 1:
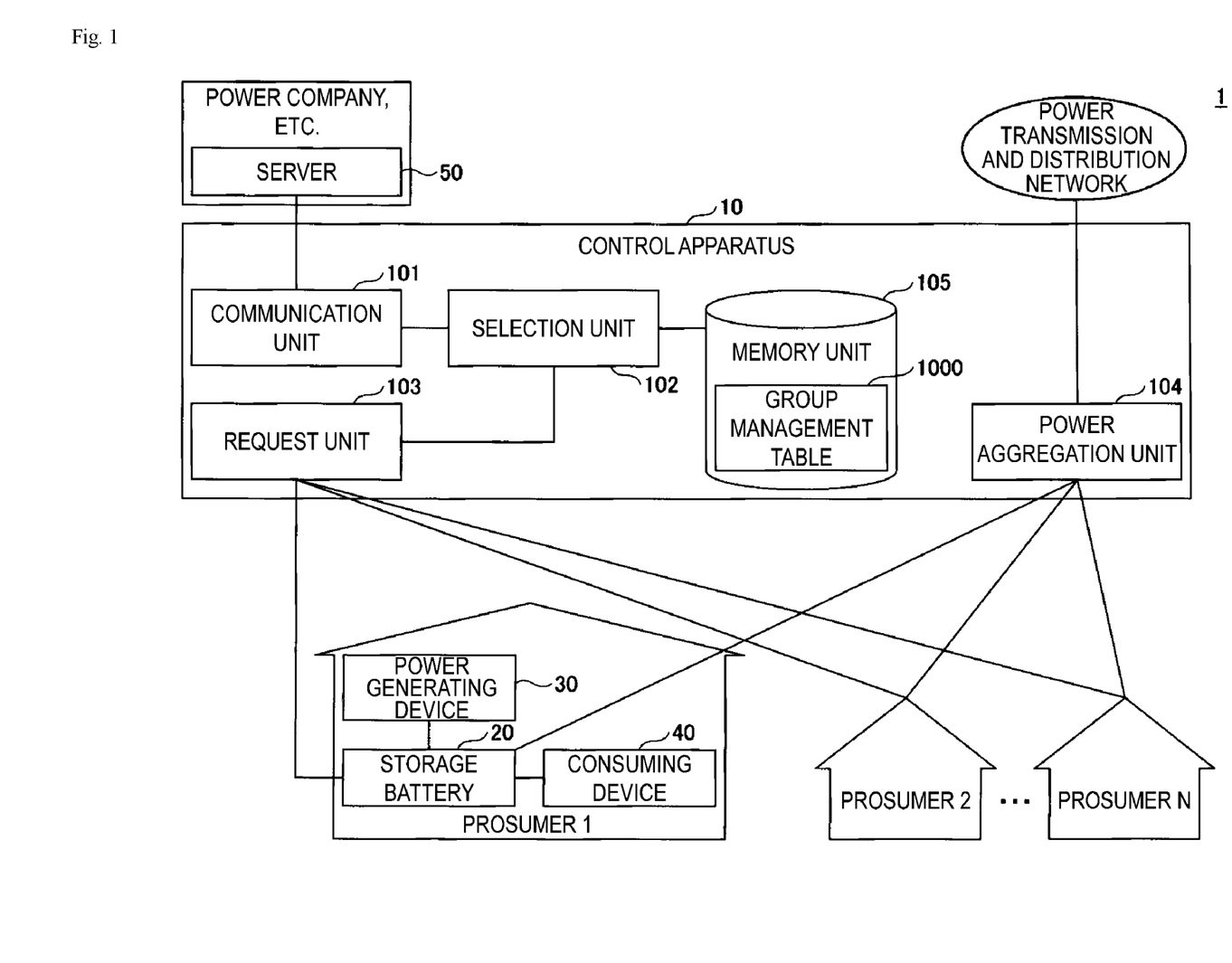
FIG. 1 is a diagram illustrating an example of an overall configuration of a power supply system according to the present embodiment.

First, an overall configuration of a power supply system 1 according to the present embodiment will be described with reference to FIG. 1. FIG. 1 is a diagram illustrating an example of an overall configuration of the power supply system 1 according to the present embodiment.

The power supply system 1 according to the present embodiment includes a control apparatus 10, a plurality of storage batteries 20, a plurality of power generating devices 30, and a plurality of consuming devices 40 as illustrated in FIG. 1.

The storage batteries 20 are batteries storing electric power generated by the power generating devices 30. Here, the storage batteries 20 have different power supply characteristics (e.g., response times of the storage batteries) according to their types and the like. In the present embodiment, one example of the power supply characteristics of the storage batteries 20 is assumed to be a response time.

Note that the response time of the storage battery is a time required for the storage battery to start charging and discharging, for example. There is a concept called a "response speed" related to the response time of the storage battery, and a short response time means a fast response speed while a long response time means a slow response speed.

For example, types of the storage battery 20 include a "lead storage battery" and a "lithium-ion battery", and typically, a lithium-ion battery has a shorter response time than a lead storage battery. In addition, there are various types of lithium ion batteries (e.g., cobalt-based, nickel-based, manganese-based, iron phosphate-based, ternary-based, and titanic acid-based), and the response time varies according to the types. Note that types of the storage battery 20 include, for example, a nickel-hydride battery and a nickel-cadmium battery, in addition to a lead storage battery and a lithium-ion battery.

The power generating device 30 is a device, a facility, or the like that generates electric power using an electrochemical reaction, mechanical energy, or the like, and is, for example, a solar panel for solar power generation, or the like. Note that, in addition to this, the power generating device 30 may be a device or a facility that generates electric power by various power generation methods (e.g., pumped-storage power generation, wind power generation, and geothermal power generation) for obtaining renewable energy.

The consuming device 40 is a device, a facility, or the like that consumes electric power stored in the storage battery 20. For example, in a case in which the prosumer is a general household, the consuming device 40 may be any of various electrical appliances or the like. On the other hand, for example, in a case in which the prosumer is a factory, the consuming device 40 may be any of various industrial facilities or the like.

Here, in the present embodiment, when the number of prosumers is N (N is a natural number of two or greater), the respective prosumers are referred to as "prosumer 1", ..., and "prosumer N". Furthermore, when it is assumed that each prosumer has one storage battery 20, one power generating device 30, and one consuming device 40, the storage battery 20, the power generating device 30, and the consuming device 40 of the prosumer n (n=1, ..., N) are referred to as "a storage battery $20_n$", "a power generating device $30_n$", and "a consuming device $40_n$", respectively. However, this is an example, and each prosumer may have a plurality of storage batteries 20, a plurality of power generating devices 30, or a plurality of consuming devices 40.

The control apparatus 10 is a computer or a computer system that integrates and controls electric power owned by each prosumer (that is, electric power stored in the storage battery 20 owned by each prosumer). In other words, the control apparatus 10 functions as an aggregator of a VPP achieved by the control apparatus 10 and each prosumer.

Here, the control apparatus 10 according to the present embodiment includes a communication unit 101, a selection unit 102, a request unit 103, a power aggregation unit 104, and a storage unit 105.

The communication unit 101 receives, from a server 50, a request for necessary electric power via a communication network (e.g., a local area network (LAN), a mobile telephone network, and the Internet). In such a request, at least a necessary amount of electric power (request power amount) and a timing when the electric power is needed (request timing) are specified. Note that such a request corresponds to a demand response from a power company, an electricity market, or the like, for example. Hereinafter, a request transmitted from the server 50 is also referred to as a "first request". In the first request, for example, a request time and a request power such as a request timing "X hours later", a request power "Y kW" are specified.

When the first request is received by the communication unit 101, the selection unit 102 refers to a group management table 1000 stored in the storage unit 105 to select a group of storage batteries 20 capable of supplying electric power at the request timing specified in the first request. Here, it is assumed in the present embodiment that the storage batteries 20 owned by the prosumers are classified into a plurality of groups in advance in accordance with the response times, and the classification results are managed in the group management table 1000. Thus, the selection unit 102 can identify and select a group with response times that enable supply of electric power at the request timing specified in the first request with reference to the group management table 1000. Note that details of the group management table 1000 will be described below.

The request unit 103 transmits, via the communication network, a request in which a discharge amount and a discharge timing are specified to each of the one or more storage batteries 20 (or a device that controls charging and discharging of the storage battery 20, or the like) included in the group selected by the selection unit 102. Hereinafter, the request transmitted to each of the storage batteries 20 is also referred to as a "second request". When each storage batteries 20 (or the device that controls charging and discharging of the storage battery 20, or the like) receives the second request, the discharge amount of electric power specified in the second request is discharged from the storage battery 20 at the discharge timing specified in the second request.

Note that, although the request timing specified in the first request and the discharge timing specified in the second request are the same (or these timings, inclusive of the time requested for communication, the time requested for discharge, etc., are the same), the request power amount specified in the first request may be different from the discharge amount specified in the second request. For example, when such a second request is transmitted to each of the plurality of storage batteries 20 (or the device that controls charging and discharging of the storage battery 20, or the like), the discharge amount specified in the second request to be transmitted to each of the plurality of storage batteries 20 (or the device that controls charging and discharging of the storage battery 20, or the like) may be different from the request power amount specified in the first request. In this case, a total of the discharge amounts specified in the second requests is equal to the request power amount specified in the first request.

The power aggregation unit 104 aggregates electric power discharged from the storage batteries 20 in accordance with the second requests and outputs the electric power to a power transmission and distribution network. As a result, the amount of electric power requested in the first request from the power company, the electricity market, or the like is output at the request timing. Note that the electric power discharged from the storage battery 20 owned by each prosumer is also transmitted to the control apparatus 10 via the power transmission and distribution network.

The storage unit 105 stores various data (e.g., the group management table 1000 described above).

Note that the configuration of the control apparatus 10 illustrated in FIG. 1 is an example, and other configurations may be adopted. For example, the power aggregation unit 104 may be provided in another apparatus different from the control apparatus 10.

Figure 2:
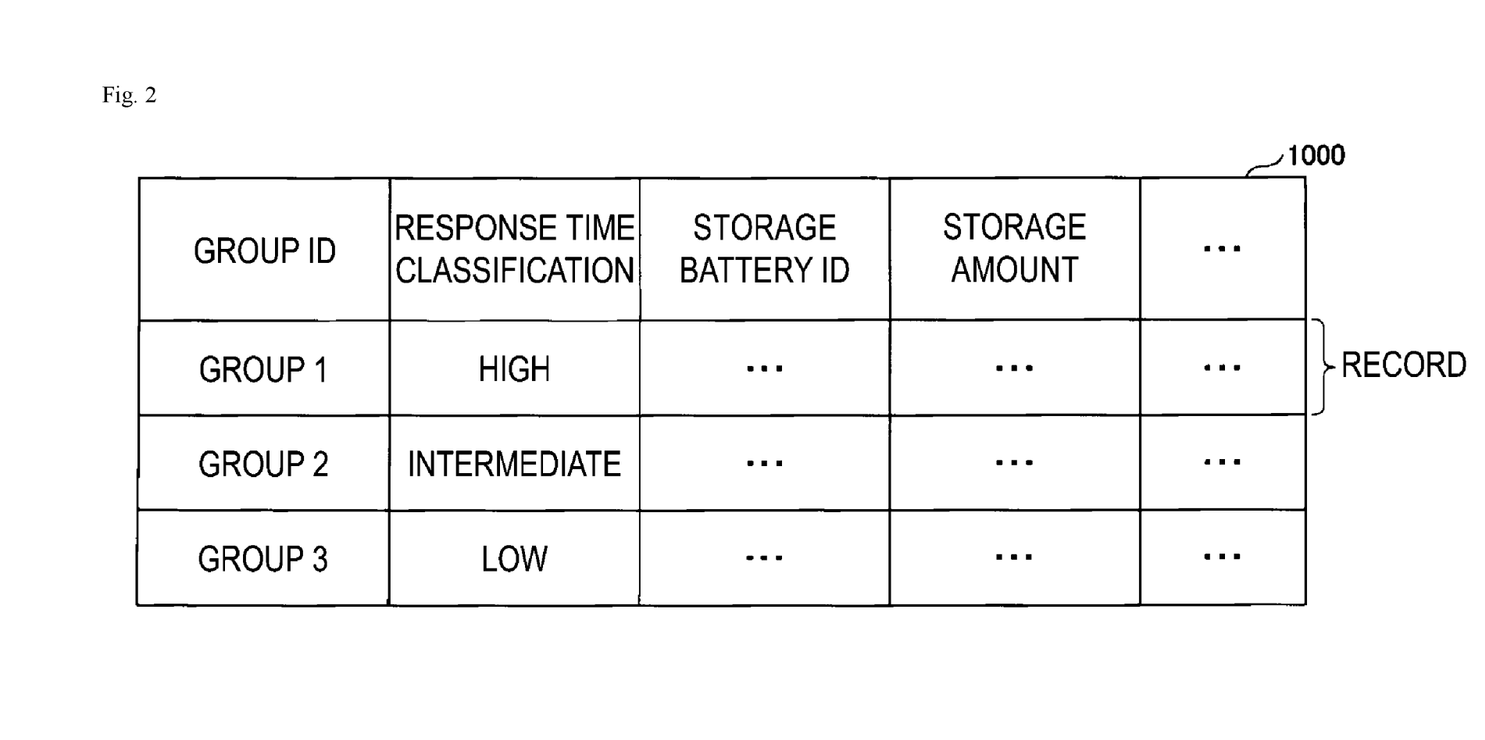
FIG. 2 is a diagram illustrating an example of a group management table.

Here, an example of the group management table 1000 stored in the storage unit 105 will be described with reference to FIG. 2. FIG. 2 is a diagram illustrating an example of the group management table 1000.

The group management table 1000 stores a plurality of records (three records in the example illustrated in FIG. 2), and each record includes a "group ID", a "response time classification", a "storage battery ID", a "storage amount", and the like as attributes as illustrated in FIG. 2.

The group ID is set in the attribute "group ID" as an example of identification information for identifying a group into which each storage battery 20 is classified. In the example illustrated in FIG. 2, "Group 1", "Group 2", and "Group 3" are set as three records in the attribute "record ID".

In the attribute "response time classification", information representing a response time of a group into which each storage battery 20 is classified is set. In the example illustrated in FIG. 2, "high" is set for the attribute "response time classification" of the record corresponding to the group ID "Group 1", "intermediate" is set for the attribute "response time classification" of the record corresponding to the group ID "Group 2", and "low" is set for the attribute "response time classification" of the record corresponding to the group ID "Group 3". In this case, when predetermined thresholds are $t_1$, $t_2$, and $t_3$ (where $t_1<t_2<t_3$), for example, a storage battery 20 with a response time less than $t_1$ is classified into the group with the group ID "Group 1", a storage battery 20 with a response time equal to or longer than $t_1$ and less than $t_2$ is classified into the group with the group ID "Group 2", and a storage battery 20 with a response time equal to longer than $t_2$ and less than $t_3$ is classified into the group with the group ID "Group 3". Note that $t_3$ is, for example, a maximum value of the time required for charging and discharging, or the like, regardless of the types of the storage batteries 20.

In the attribute "storage battery ID", storage battery IDs are set as identification information for identifying the storage batteries 20 classified into each group. For example, in the attribute "storage battery ID" of the record corresponding to the group ID "Group 1", a storage battery ID of each storage battery 20 classified into the group identified by this group ID is set. Similarly, in the attribute "storage battery ID" of the record corresponding to the group ID "Group 2", a storage battery ID of each storage battery 20 classified into the group identified by this group ID is set. The same applies to the attribute "storage battery ID" of the record corresponding to the group ID "Group 3".

In the attribute "storage amount", an amount of electric power stored in each storage battery 20 classified into the corresponding group is set. For example, in the attribute "storage amount" of the record corresponding to the group ID "Group 1", an amount of electric power stored in each storage battery 20 classified into the group identified by this group ID is set. The same applies to the attribute "storage amount" of the records corresponding to the group ID "Group 2" and the group ID "Group 3". Note that, in the attribute "storage amount", for example, a total of the amounts of electric power stored in the storage batteries 20 classified into the corresponding group may be set.

As described above, the group management table 1000 stored in the storage unit 105 includes a plurality of records, and each record includes a response time classification representing a classification of the response time of the corresponding group and information representing each storage battery 20 classified into the corresponding group. As a result, it is possible to select a group capable of supplying the request electric power at the request timing specified in the first request.

Note that, although the group management table 1000 in which the storage batteries 20 are classified into any of the three groups (any group with the response time classification "high", "intermediate" or "low") has been described in the example illustrated in FIG. 2, the embodiment is not limited to this example, and each of the storage batteries 20 may be classified into any of two or four or more groups. For example, if five records of "classification 1", "classification 2", "classification 3", "classification 4", and "classification 5" are set as response time classifications, each storage battery 20 is classified into any of the five groups.

For example, in a case in which a certain prosumer has a new storage battery 20, the storage battery 20 is classified into any of the plurality of groups based on information collected from the storage battery 20, an operation by an administrator of the control apparatus 10, or the like. In this case, the storage battery ID of the storage battery 20 is added to the attribute "storage battery ID" of the corresponding record of the plurality of records stored in the group management table 1000. On the other hand, in a case in which the storage battery 20 owned by a certain prosumer is discarded, the storage battery ID of the storage battery 20 is deleted from the attribute "storage battery ID" of the corresponding record stored in the group management table 1000.

Hardware Configuration of Control Apparatus 10

Figure 3:
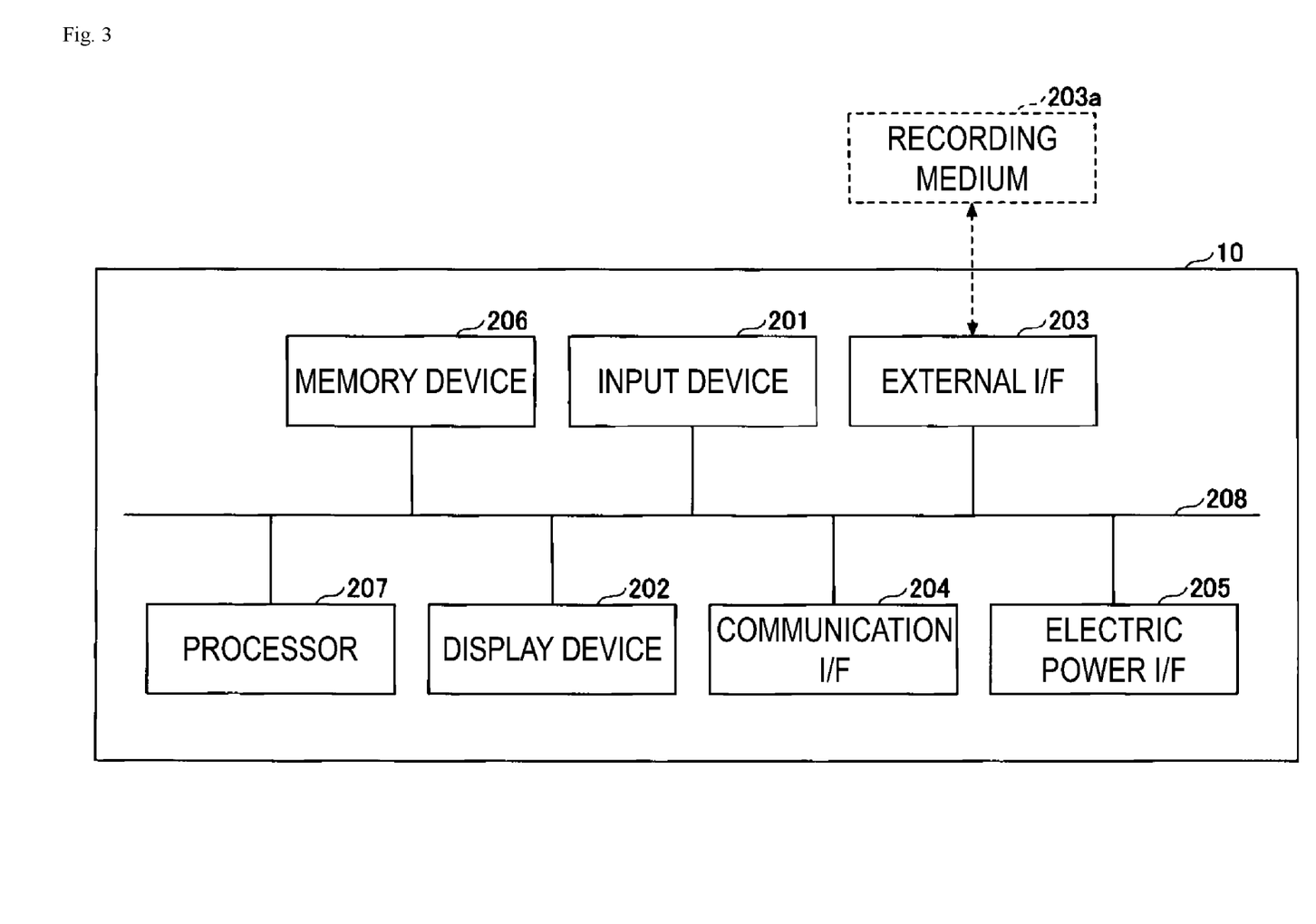
FIG. 3 is a diagram illustrating an example of a hardware configuration of a control apparatus according to the present embodiment.

Next, a hardware configuration of the control apparatus 10 according to the present embodiment will be described with reference to FIG. 3. FIG. 3 is a diagram illustrating an example of the hardware configuration of the control apparatus 10 according to the present embodiment.

As illustrated in FIG. 3, the control apparatus 10 according to the present embodiment includes an input device 201, a display device 202, an external I/F 203, a communication I/F 204, an electric power I/F 205, a memory device 206, and a processor 207. Each hardware device is connected to the others by a bus 208 to enable mutual communication.

Examples of the input device 201 include a keyboard, a mouse, a touch panel, and various operation buttons. Examples of the display device 202 include a display. Note that the control apparatus 10 does not need to include at least one of the input device 201 or the display device 202.

The external I/F 203 is an interface with an external device such as a recording medium 203a. Examples of the recording medium 203a include a CD, a DVD, an SD memory card, and a USB memory.

The communication I/F 204 is an interface for connecting the control apparatus 10 to a communication network. The electric power I/F 205 is an interface for connecting the control apparatus 10 to a power transmission and distribution network.

The memory device 206 is, for example, any of various memory devices such as a random access memory (RAM), a read only memory (ROM), a flash memory, a hard disk drive (HDD), and a solid state drive (SSD). The storage unit 105 can be achieved using, for example, the memory device 206. However, the storage unit 105 may be achieved using a storage device, a database server, or the like connected to the control apparatus 10 via a communication network.

The processor 207 is any of various arithmetic devices such as a central processing unit (CPU). Each functional unit of the control apparatus 10 (the communication unit 101, the selection unit 102, the request unit 103, and the power aggregation unit 104) is implemented, for example, by processing in which the processor 207 executes one or more programs stored in the memory device 206.

The control apparatus 10 according to the present embodiment has the hardware configuration illustrated in FIG. 3 and thus can implement various processing operations described below. Note that the hardware configuration illustrated in FIG. 3 is an example, and the control apparatus 10 may have another hardware configuration. For example, the control apparatus 10 according to the present embodiment may include a plurality of memory devices 206, or may include a plurality of processors 207.

Power Supply Control Processing

Figure 4:
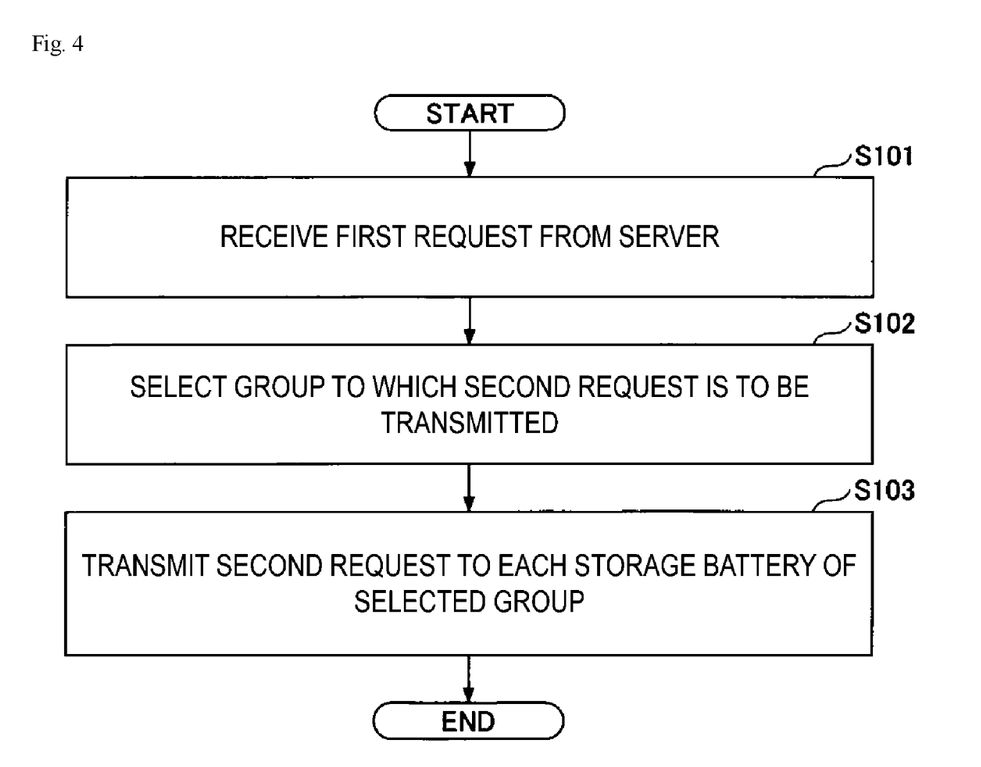
FIG. 4 is a flowchart illustrating an example of power supply control processing according to the present embodiment.

Next, processing in which the control apparatus 10 performs control of supplying electric power stored in each storage battery 20 in response to the first request from a power company or the like (power supply control processing) will be described with reference to FIG. 4. FIG. 4 is a flowchart illustrating an example of the power supply control processing according to the present embodiment.

Step S101: The communication unit 101 receives the first request from the server 50 via a communication network. Note that the first request includes at least a request power amount and a request timing as described above.

Step S102: Next, the selection unit 102 refers to the group management table 1000 stored in the storage unit 105 to select a group to which the second request is to be transmitted (that is, a group of storage batteries 20 that can supply electric power at the request timing specified in the first request).

For example, it is assumed that each storage battery 20 is classified into a group as follows in accordance with response times based on predetermined thresholds having a relationship of $t_1 < t_2 < t_3$. Note that $t_3$ is, for example, a maximum value of the time required for charging and discharging, or the like, regardless of the types of the storage batteries 20.

A storage battery 20 with a response time less than $t_1$: the group with the response time classification "high"

A storage battery 20 with a response time equal to longer than $t_1$ and less than $t_2$: the group with the response time classification "intermediate"

A storage battery 20 with a response time equal to longer than $t_2$ and less than $t_3$: the group with the response time classification "low"

That is, the group with the response time classification "high" is a group of storage batteries 20 that can start discharging at least within less than the time $t_1$ from when the request to start discharging (i.e., the second request) is made. In addition, the group with the response time classification "intermediate" is a group of storage batteries 20 that require at least the time $t_1$ to start discharging, but can start discharging at least within less than the time $t_2$ from when the request to start discharging is made. Furthermore, the group with the response time classification "low" is a group of storage batteries 20 that require at least the time $t_2$ to start discharging from when the request to start discharging is made.

At this time, for example, in a case in which the request timing specified in the first request is "a time b (where $t_1 < b < t_2$) later", the selection unit 102 selects the group with the response time classification "high" as the group to which the second request is to be transmitted. In this case, each storage battery 20 classified into the group with the response time classification "high" can satisfy the request timing specified in the first request.

Similarly, for example, in a case in which the request timing specified in the first request is "a time b (where $t_2 < b < t_3$) later", the selection unit 102 selects the group with the response time classification "intermediate" as the group to which the second request is to be transmitted. In this case, each storage battery 20 classified into the group with the response time classification "intermediate" can satisfy the request timing specified in the first request. However, in this case, the selection unit 102 may select the group with the response time classification "high". This is because each storage battery 20 classified into the group with the response time classification "high" can also satisfy the request timing specified in the first request.

Note that there may be a case in which the group selected in step S103 above does not satisfy the request power amount specified in the first request (that is, the total storage amount of the storage batteries 20 classified into the group is less than the request power amount). In this case, for example, the communication unit 101 may transmit, to the server 50, a response indicating that it is not possible to satisfy the supply request or a response indicating that it is possible to supply only the total storage amount of the storage batteries 20 classified into the corresponding group. The total storage amount of the storage batteries 20 classified into the group selected in step S103 described above can be calculated or determined with reference to, for example, the attribute "storage amount" of the corresponding records among the records stored in the group management table 1000.

Step S103: The request unit 103 transmits a second request in which a discharge amount and a discharge timing are specified to each of one or more storage batteries 20 (or the device that controls charging and discharging of the storage battery 20, or the like) classified into the group selected in step S102 above (hereinafter, also indicated as "a selected group"). At this time, for example, the request unit 103 is only required to select storage batteries 20 in descending order of their storage amounts and determine their discharge amounts, among the storage batteries 20 classified into the selected group, until the request electric power is met and then to transmit the second request to each of the selected storage batteries 20.

Specifically, it is assumed that three storage batteries 20 classified into the selected group are "a storage battery $20_1$", "a storage battery $20_2$", and "a storage battery $20_3$", and their storage amounts are "10 kW", "8 kW", and "7 kW". In addition, it is also assumed that a request power amount specified in the first request is "12 kW". In this case, for example, the request unit 103 sequentially selects and determines the storage battery $20_1$ (a discharge amount of "10 kW") and the storage battery $20_2$ (a discharge amount of "2 kW") and then transmits a second request in which the discharge amount "10 kW" is specified to the storage battery $20_1$ (or a device that controls charging and discharging of the storage battery $20_1$ or the like), and transmits a second request in which the discharge amount of "2 kW" is specified to the storage battery $20_2$ (a device that controls charging and discharging of the storage battery $20_2$ or the like). Note that, the same timing as the request timing specified in the first request is only required to be specified as the discharge timing in each second request.

Note that each storage battery 20 to which the second request is to be transmitted may be selected and the discharge amount may be determined such that electric power is discharged up to a predetermined reference value, rather than discharging all of the electric power stored in the storage batteries 20 in the specific example described above. Specifically, it is assumed that a maximum storage amount of the storage battery $20_1$, the storage battery $20_2$, and the storage battery $20_3$ is "10 kW", and the reference value is "4 kW" (that is, 40% of the maximum storage amount). In this case, the storage battery $20_1$, the storage battery $20_2$, and the storage battery $20_3$ are capable of discharging electric power until the storage amount becomes 4 kW. Thus, in this case, for example, the request unit 103 sequentially selects and determines the storage battery $20_1$ (a discharge amount of "6 kW"), the storage battery $20_2$ (a discharge amount of "4 kW"), and the storage battery $20_3$ (a discharge amount of "2 kW") and then transmits a second request in which the discharge amount of "6 kW" is specified to the storage battery $20_1$ (or the device that controls charging and discharging of the storage battery $20_1$ or the like), a second request in which the discharge amount of "4 kW" is specified to the storage battery $20_2$ (or the device that controls charging and discharging of the storage battery $20_2$ or the like), and a second request in which the discharge amount of "2 kW" is specified to the storage battery $20_3$ (or the device that controls charging and discharging of the storage battery $20_3$ or the like). As a result, the remaining storage amounts of the storage batteries 20 in the selected group can be leveled. Further, for example, it is possible to prevent a reduction in the life of the storage batteries 20 due to the decrease of the storage amount to zero.

As described above, the second request is transmitted to each of the one or more storage batteries 20 (or the device that control charging and discharging of the storage battery 20, or the like) among the storage batteries 20 classified into the selected group. As a result, the discharge amount of electric power specified in the second request is discharged from each of the corresponding storage batteries 20 at the discharge timing specified in the second request. Then, the electric power discharged from the corresponding storage batteries 20 is aggregated by the power aggregation unit 104 and output to the power transmission and distribution network.

As described above, in response to a first request from the server 50, such as a power company, the control apparatus 10 according to the present embodiment selects a group of storage batteries 20 (supply sources) with supply characteristics that can satisfy the first request (a power supply request) and then transmits second requests (discharge start requests) to the storage batteries 20 classified into the selected group. As a result, the VPP achieved by the control apparatus 10 and each prosumer according to the present embodiment can supply electric power in response to the power supply request while satisfying the request timing and the request power amount specified in the power supply request.

The present invention is not limited to the above-described embodiment disclosed in detail, and various modifications and alterations may be made without departing from the scope of the claims.

REFERENCE SIGNS LIST

1 Power supply system
10 Control apparatus
20 Storage battery
30 Power generating device
40 Consuming device
50 Server
101 Communication unit
102 Selection unit
103 Request unit
104 Power aggregation unit
105 Storage unit
201 Input device
202 Display device
203 External I/F
204 Communication I/F
205 Electric power I/F
206 Memory device
207 Processor
208 Bus
1000 Group management table

The invention claimed is:

1. A control apparatus comprising one or more processors configured to:
receive, from a server, a first request that specifies a first power amount to be supplied and a timing when the first power amount is to be supplied;
in response to receiving the first request, select a group of supply sources from a plurality of supply sources according to (i) a power supply characteristic associated with each supply source of the group of supply sources and (ii) an aggregate power supply according to the first power amount at the timing specified in the first request; and
transmit, to each supply source of the group of supply sources, a second request that causes each supply source to supply a second power amount at the timing specified in the first request.

2. The control apparatus according to claim 1, wherein the power supply characteristic associated with each supply source is a time required from when the supply source or a device that controls power supply of the supply source receives the second request to when the supply source starts supplies a respective second power amount.

3. The control apparatus according to claim 1, wherein wherein the one or more processors are further configured to transmit a plurality of second requests to each supply source of the group of supply sources such that a total of each of the second power amount specified in the plurality of second requests is the first power amount.

4. The control apparatus according to claim 1, wherein the one or more processors are further configured to:
select, with reference to a table in which each group, information representing a power supply characteristic associated with each supply source classified into the group of supply sources, and an amount of electric power that can be supplied by each supply source classified into the group of supply sources are associated with each other, a group that enables power supply at the timing and can supply the first power amount of electric power, among a plurality of groups.

5. A control method comprising:
receiving, from a server, a first request that specifies a first power amount to be supplied and a timing when the first power amount is to be supplied;
in response to receiving the first request, selecting a group of supply sources from a plurality of supply sources according to (i) a power supply characteristic associated with each supply source of the group of supply sources and (ii) an aggregate power supply according to the first power amount at the timing specified in the first request; and
transmitting, to each supply source of the group of supply sources, a second request that causes each supply source to supply a second power amount at the timing specified in the first request.

6. The control method according to claim 5, wherein the power supply characteristic associated with each supply source is a time required from when the supply source or a device that controls power supply of the supply source receives the second request to when the supply source starts supplies a respective second power amount.

7. The control method according to claim 5, further comprising transmitting, a plurality of second requests to each supply source of the group of supply sources such that a total of each of the second power amount specified in the plurality of second requests is the first power amount.

8. The control method according to claim 5, further comprising selecting, with reference to a table in which each group, information representing a power supply characteristic associated with each supply source classified into the group of supply sources, and an amount of electric power that can be supplied by each supply source classified into the group of supply sources are associated with each other, a group that enables power supply at the timing and can supply the first power amount of electric power, among a plurality of groups.

9. A non-transitory computer-readable medium storing one or more instructions causing a computer to execute:
   receiving, from a server, a first request that specifies a first power amount to be supplied and a timing when the first power amount is to be supplied;
   in response to receiving the first request, selecting a group of supply sources from a plurality of supply sources according to (i) a power supply characteristic associated with each supply source of the group of supply sources and (ii) an aggregate power supply according to the first power amount at the timing specified in the first request; and
   transmitting, to each supply source of the group of supply sources, a second request that causes each supply source to supply a second power amount at the timing specified in the first request.

10. The non-transitory computer-readable medium according to claim 9, wherein the power supply characteristic associated with each supply source is a time required from when the supply source or a device that controls power supply of the supply source receives the second request to when the supply source starts supplies a respective second power amount.

11. The non-transitory computer-readable medium according to claim 9, further comprising transmitting a plurality of second requests to each supply source of the group of supply sources such that a total of each of the second power amount specified in the plurality of second requests is the first power amount.

12. The non-transitory computer-readable medium according to claim 9, further comprising selecting, with reference to a table in which each group, information representing a power supply characteristic associated with each supply source classified into the group of supply sources, and an amount of electric power that can be supplied by each supply source classified into the group of supply sources are associated with each other, a group that enables power supply at the timing and can supply the first power amount of electric power, among a plurality of groups.

13. The control apparatus according to claim 1, wherein the first power amount specified in the first request is different from each second power amount in each of the second requests.

14. The control apparatus according to claim 1, wherein the first power amount specified in the first request is equal to an aggregate of second power amounts totaled across each of the second requests.

* * * * *